United States Patent
Shinohara et al.

(10) Patent No.: US 7,509,475 B2
(45) Date of Patent: Mar. 24, 2009

(54) VIRTUAL MACHINE CONTROL METHOD AND VIRTUAL MACHINE SYSTEM HAVING HOST PAGE TABLE ADDRESS REGISTER

(75) Inventors: Makiko Shinohara, Hadano (JP); Akiko Mori, Ebina (JP); Shuhei Matsumoto, Yokohama (JP); Isao Watanabe, Hadano (JP); Hiroyuki Mitome, Hadano (JP)

(73) Assignee: Hitachi, Ltd., Tokyo (JP)

( * ) Notice: Subject to any disclaimer, the term of this patent is extended or adjusted under 35 U.S.C. 154(b) by 320 days.

(21) Appl. No.: 11/586,539

(22) Filed: Oct. 26, 2006

(65) Prior Publication Data
US 2007/0101099 A1 May 3, 2007

(30) Foreign Application Priority Data
Oct. 27, 2005 (JP) .............................. 2005-312143

(51) Int. Cl.
*G06F 12/10* (2006.01)
(52) U.S. Cl. ............................ 711/207; 711/6; 711/206
(58) Field of Classification Search ....................... None
See application file for complete search history.

(56) References Cited

U.S. PATENT DOCUMENTS

2002/0029308 A1* 3/2002 Babaian et al. ............. 710/240

FOREIGN PATENT DOCUMENTS

| JP | 07-093221 | 4/1995 |
|---|---|---|
| JP | 2001-051900 | 2/2001 |
| JP | 2002-202999 | 7/2003 |
| JP | 2004-258698 | 9/2004 |

* cited by examiner

*Primary Examiner*—Jack A Lane
(74) *Attorney, Agent, or Firm*—Antonelli, Terry, Stout & Kraus, LLP.

(57) ABSTRACT

A virtual machine control method and a virtual machine system are disclosed. In the case where a guest program can be operated in a plurality of address translation modes and the same guest virtual address is translated into different host real addresses in each address translation mode, the illegal access to a host real address by illegal address translation by double registration in the same page table is avoided, and the address translation mechanism is efficiently operated. A plurality of host page tables are prepared in the main storage, and one of the host page tables is selected with the change in address translation mode of the guest program. The bottom address of the selected host page table is set in the host page table register thereby to switch the host page table.

8 Claims, 6 Drawing Sheets

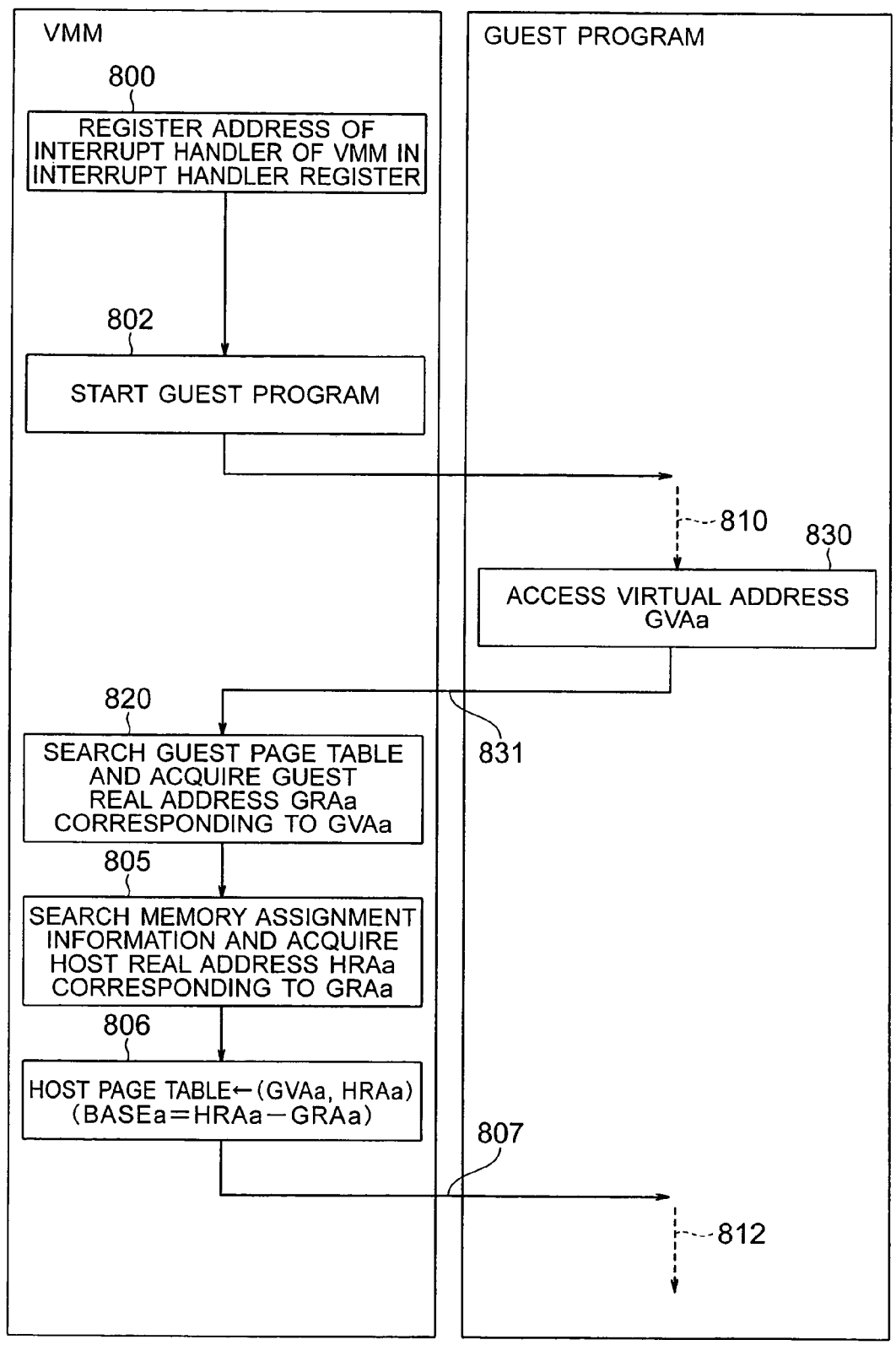

VIRTUAL MACHINE CONTROL METHOD AND VIRTUAL MACHINE SYSTEM HAVING HOST PAGE TABLE ADDRESS REGISTER

INCORPORATION BY REFERENCE

The present application claims priority from Japanese application JP 2005-312143 filed on Oct. 27, 2005, the content of which is hereby incorporated by reference into this application.

BACKGROUND OF THE INVENTION

This invention relates to a virtual machine system comprising a plurality of virtual machines constructed under the control of a host program (also referred to as the virtual machine monitor) on a physical computer system with a guest program operating on each virtual machine, or in particular to a virtual machine system wherein a page table for translating the guest virtual address to the host real address is managed by the host program.

In a virtual machine system for partitioning the real main storage logically and assigning the partitions to one or a plurality of virtual machines, a technique is available as disclosed in JP-A-2001-051900, using a translation table indicating the correspondence between the guest virtual address and the host real address. In the case where the guest program can operate in a plurality of address translation modes and a page table exists for translating the same guest virtual address into different host real addresses in each address translation mode, the technical unit disclosed in JP-A-2001-051900 generates a performance overhead.

In the virtual machine system, there is available a technique, as disclosed in JP-A-07-093221, in which the contents registered in the address translation buffer are saved before switching the guest program and the address translation information is read from the dedicated saving area of the guest program thereby to replace the contents registered in the address translation buffer.

SUMMARY OF THE INVENTION

The problem to be solved by the invention concerns a case in which a virtual machine system with a platform free of hardware assist is constructed with regard to the address translation mechanism of the virtual machine. In the case where the guest program operating on a virtual machine is operable in a plurality of address translation modes and the same guest virtual address is translated into different host real addresses in each address translation mode, the access to an illegal host real address by illegal address translation with double registration in the same page table is avoided. For this purpose, in accordance with the guest address translation mode, all the entries in the page table are required to be invalidated and replaced, thereby consuming a considerable time.

The feature of this invention is that a plurality of host page tables are prepared for each virtual machine, and in accordance with the change in the address translation mode of the guest program operating on the virtual machine, one of the host page tables is selected, and the bottom address of the selected host page table is set to the register pointing to the bottom address of the page table thereby to select the host page table. Also, a part of the plurality of the host page tables is shared by a plurality of processors.

According to this invention, the page table can be switched quickly in accordance with the switching of the address translation mode of the guest program, and therefore the performance of the virtual machine system is effectively improved.

Other objects, features and advantages of the invention will become apparent from the following description of the embodiments of the invention taken in conjunction with the accompanying drawings.

BRIEF DESCRIPTION OF THE DRAWINGS

FIG. 8 is a flowchart showing a second method of preparing the host page table.

DESCRIPTION OF THE EMBODIMENTS

Embodiments of the invention are described below with reference to the drawings.

First Embodiment

Figure 1:
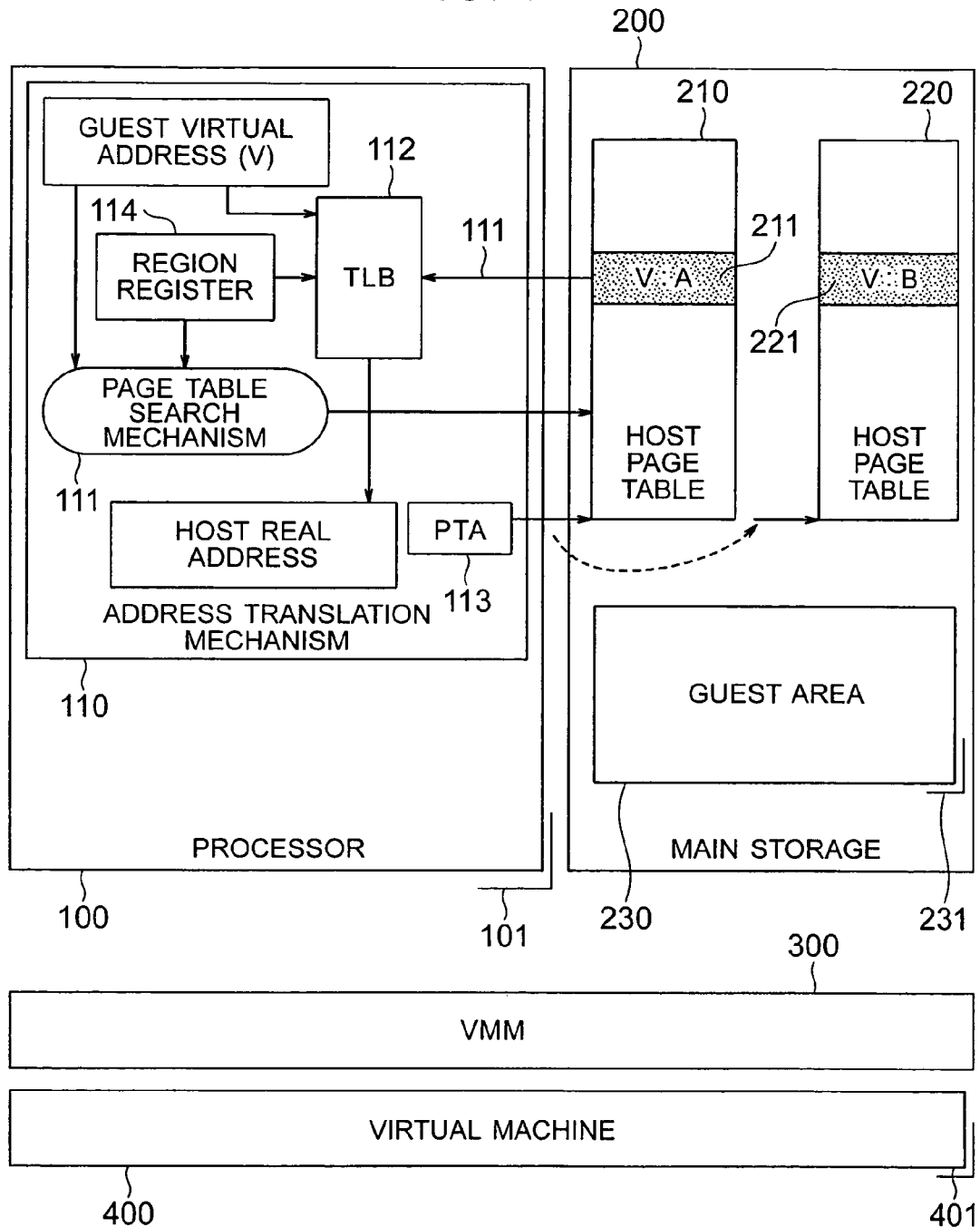
FIG. 1 is a diagram showing a configuration of a virtual machine system according to an embodiment of the invention.

FIG. 1 is a diagram showing a configuration of a virtual machine system according to an embodiment of the invention. In FIG. 1, a processor 100 and a processor 101 each have an address translation mechanism 110.

The address translation mechanism 110 includes a TLB (translation lookaside buffer) 112 for registering the correspondence between the guest virtual address and the host real address, a page table search mechanism 111 for registering the correspondence between the guest virtual address and the host real address in the TLB 112 by searching a host page table 210 (or a host page table 220) prepared on a main storage 200 in the case where the correspondence is not registered in the TLB 112, and a PTA register 113 indicating the bottom address of the host page table. A plurality of host page tables are available including and in addition to the host page tables 210, 220 on the main storage 200. Only in the case where the bottom address of a host page table is set in the PTA register 113, the host page table constitutes an object to be searched by the page table search mechanism 111.

A virtual machine monitor (VMM) 300 is a host program executed by the processor 100 and can access the whole of the main storage 200. The VMM 300 constructs and controls virtual machines 400, 401 by logically partitioning and assigning the processors 100, 101 and the main storage 200. A part of the main storage 200 logically partitioned and assigned to the virtual machines 400, 401 by the VMM 300 is called the guest areas 230, 231.

The guest program operating on the virtual machine 400 attempts to register the correspondence between the guest virtual address and the guest real address in the TLB 112 in order that virtual address space may access the guest area 230 assigned to the virtual machine 400.

With the attempt of the guest program to register the correspondence between the guest virtual address and the guest real address in the TLB 112 as a motive, the VMM 300 is activated and registers the correspondence between the guest virtual address and the host real address in the host page table 210, thereby transferring the control to the guest program.

Figure 3:
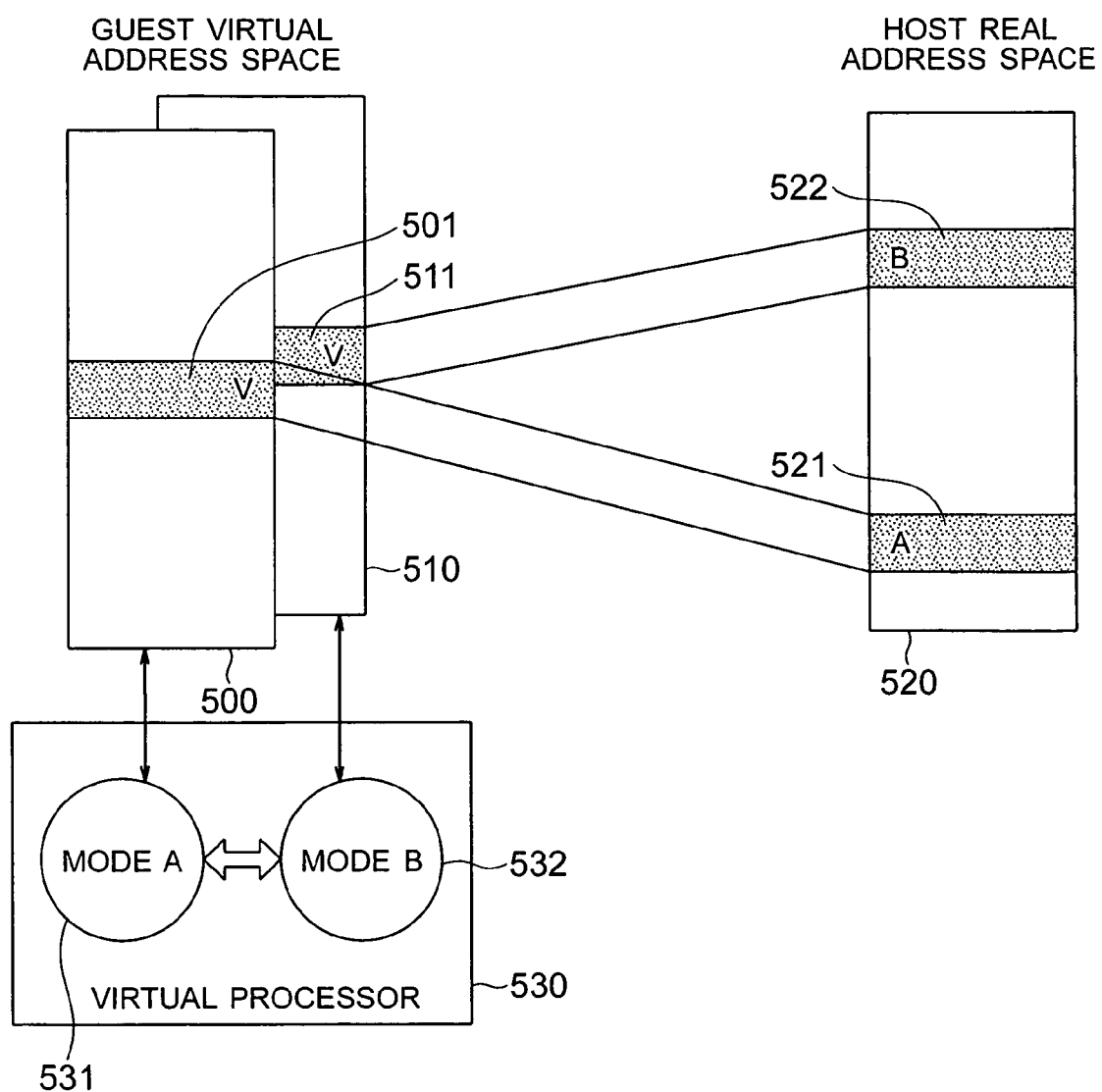
FIG. 3 is a diagram showing that the same guest virtual address corresponds to different host real addresses in accordance with the guest address translation mode.

FIG. 3 shows that the virtual processor 530 with the guest program operating therein uses the guest virtual address space 500 by operating in the mode A 531 constituting one of a plurality of address translation modes in one case, and uses the guest virtual address space 510 by operating in the mode B 532 constituting another address translation mode in another case, wherein the same guest virtual address 501 and the guest virtual address V 511 of different guest virtual address space 500 and the guest virtual address space 510 correspond to different host real addresses A 521 and B 522 of the host real address space 520.

The VMM 300 sets the address of the first host page table 210 to the PTA register 113 in the case where the guest program operates in the address translation mode A 531 so that the page table search mechanism 111 searches the first host page table 210. Also, the VMM 300 sets the correspondence between the guest virtual address V 501 and the host real address A 521 used by the guest program in the mode A 531, in the entry 211 of the first host page table 210.

Further, the VMM 300 sets the correspondence between the guest virtual address V 511 and the host real address B 522 used by the guest program in the address translation mode B 532, in the entry 221 of the second host page table 220.

Figure 4:
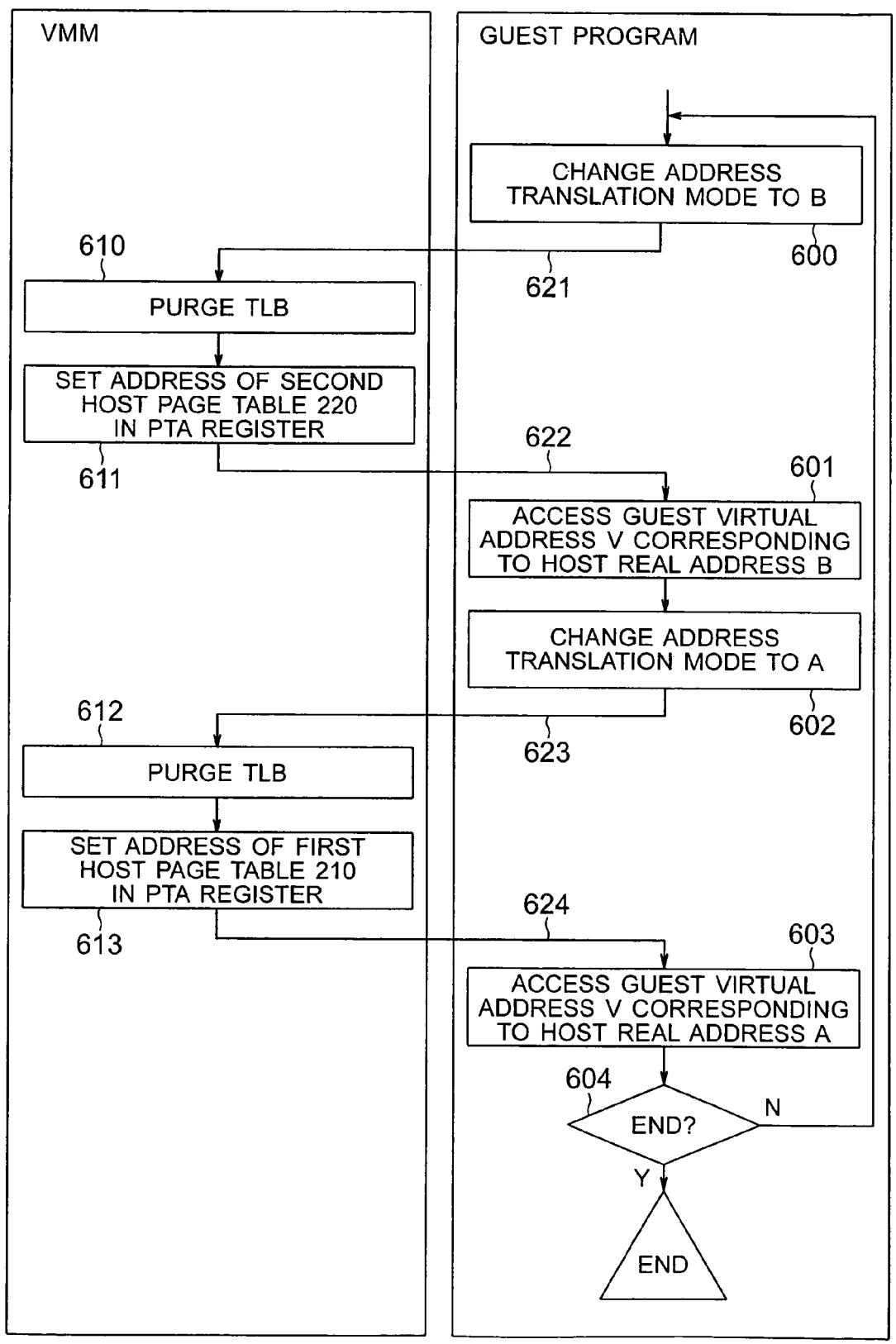
FIG. 4 is a processing flowchart for switching the host page table in accordance with the guest address translation mode.

FIG. 4 is a flowchart showing the VMM process and the guest program repeating the process in which the guest program, having thus far operated in the address translation mode A 531, accesses the main storage of the host real address A 521 corresponding to the guest virtual address V 501, and after that, changing the address translation mode to the mode B 532, accesses the main storage of the host real address B 522 corresponding to the guest virtual address V 511.

When the guest program switches the address translation mode to the mode B 532 (step 600), the control is transferred to the VMM 300 (step 621). The VMM 300 purges the translation information of the address translation mode A 531 registered in the TLB 112 (step 610), sets the address of the second host page table 220 in the PTA register 113 (step 611), and transfers the control to the guest program (step 622). When the guest program attempts to access the virtual address V 511 (step 601), the page table search mechanism 111 searches the host page table 220 designated by the PTA register 113, and registers the correspondence between the guest virtual address V 511 and the host real address B 522 in the TLB 112. As a result, in the guest program processing step 601, the main storage area of the host real address B can be correctly accessed.

Next, when the guest program switches the address translation mode to mode A 531 (step 602), the control is transferred to the VMM 300 (step 623). The VMM 300 purges the translation information of the address translation mode B 532 registered in the TLB 112 (step 612), sets the address of the first host page table 210 in the PTA register 113 (step 613), and transfers the control to the guest program (step 624). When the guest program attempts to access the guest virtual address V 501 (step 603), the page table search mechanism 111 searches the host page table 210 designated by the PTA register 113 and registers the correspondence between the guest virtual address V 501 and the host real address A 521 in the TLB 112. As a result, in the guest program processing step 603, the main storage area of the host real address A can be correctly accessed.

As described above, the VMM 300 selects an appropriate one of the plurality of host page tables in accordance with the address translation mode of the guest program, and sets the bottom address of the host page table in the PTA register 113 as an object to be searched by the page table search mechanism. In this way, the change of the address translation mode of the guest program can be followed within a short execution time. Also, the change in address translation mode eliminates the need of invalidation of the host page table. Thus, the reuse rate of the host page table entry is improved, and the exception to the address translation due to the absence of the correspondence between the guest virtual address and the host real address in the TLB 112 and the host page table occurs less frequently, resulting in an improved execution performance of the guest program.

Second Embodiment

The region register 114 shown in FIG. 1 is to hold the present region identifier in the case where the address translation mechanism 110 supports the multiple address space model and the virtual address corresponding to each address space is tagged with the region identifier. The present region identifier is used for the search of the TLB 112 by the address translation mechanism 110 and the search of the host page table 210 or 220, whichever the bottom address thereof is set in the PTA register 113.

Figure 2:
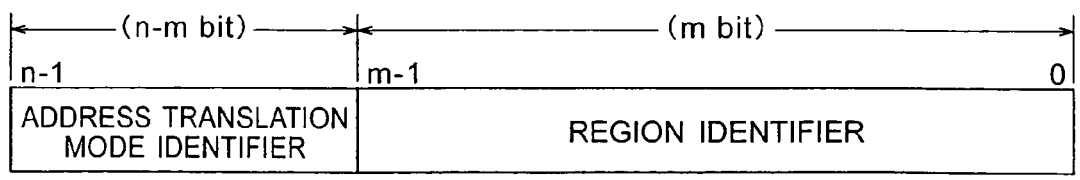
FIG. 2 is a diagram showing an embodiment in which the guest address translation mode is added to a part of the region identifier.

FIG. 2 shows a case in which the bit width of the region register 114 is n bits, and represents an embodiment in which the bit width of the region register acquired by the guest program is virtualized as m (m <n) bits by the VMM and an identifier (hereinafter referred to as the address translation mode identifier) for identifying the address translation mode of the guest program is set on a higher order than the bit m.

In the case where the address translation mode of the guest program is mode A 531 in the first embodiment, the address translation mode identifier is set to A, while the address translation mode identifier is set to B in the case where address translation mode of the guest program is mode B 532. Then, even in the case where the translation data of mode A and mode B coexist in the TLB 112, the translation information of more correct mode can be acquired by the search of the TLB 112 by the address translation mechanism 110. Therefore, the TLB purge processes 610, 612 of the processing flow in the first embodiment shown in FIG. 4 are eliminated, and the reuse rate of the TLB entry is improved. Thus, the exception to the address translation for lack of the correspondence between the guest virtual address and the host real address in the TLB and the page table occurs less frequently, resulting in a higher guest program execution performance.

Third Embodiment

Figure 5:
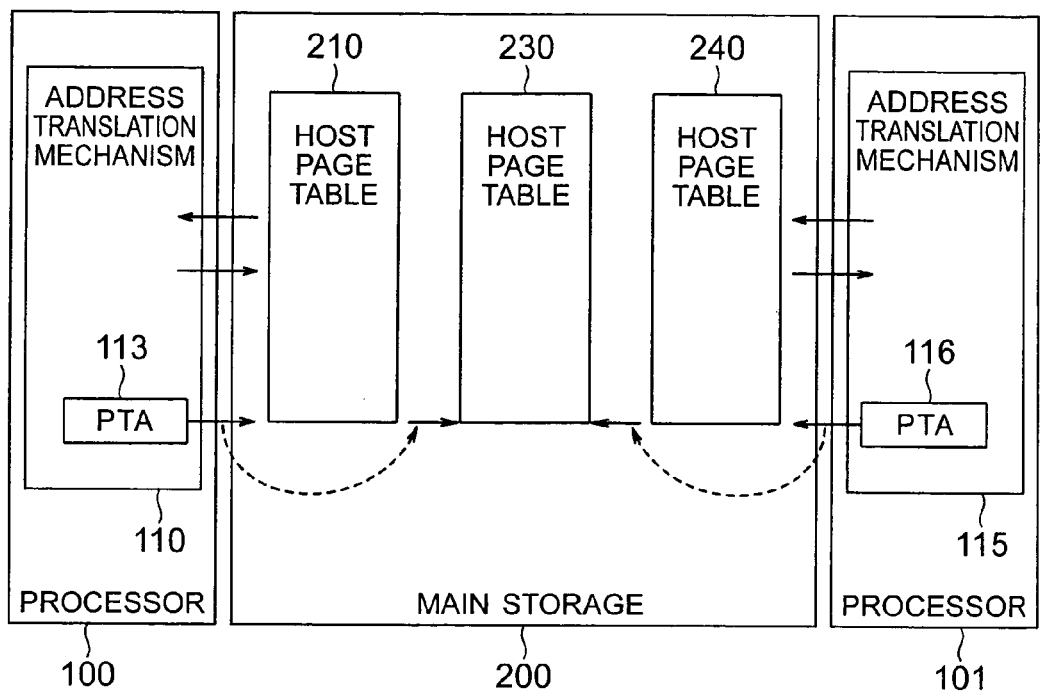
FIG. 5 is a diagram showing that a part of the host page tables is shared by the processors and each of the other host page tables is exclusively occupied by the corresponding processor.

The processors 100, 101 shown in Fig. 5 include, though simplified in description, address translation mechanisms 110, 115 equivalent to the address translation mechanism shown in FIG. 1. As described in FIGS. 1 to 4, the address translation mode of the guest program operating in the processors 100, 101 is mode A 531 in one case and mode B 532 in another case, and in accordance with the mode, the VMM switches the host page table searched by the page table search mechanism. In the case where the host page table is shared by the processors 100 and 101, the entry rewrite operation requires the exclusive control and cannot be quickly processed. In the case where all the host page tables are set as individual ones for each processor, on the other hand, the main storage would be consumed excessively.

In view of this, the host page table in which the data is rewritten less frequently is shared by the processors, while the host page table in which the data is rewritten more frequently is used exclusively by each processor. In FIG. 5, the host page table 230 is shared by the processors 100 and 101, while the host page table 210 is occupied by the processor 100 and the host page table 240 by the processor 101.

Fourth Embodiment

Figure 6:
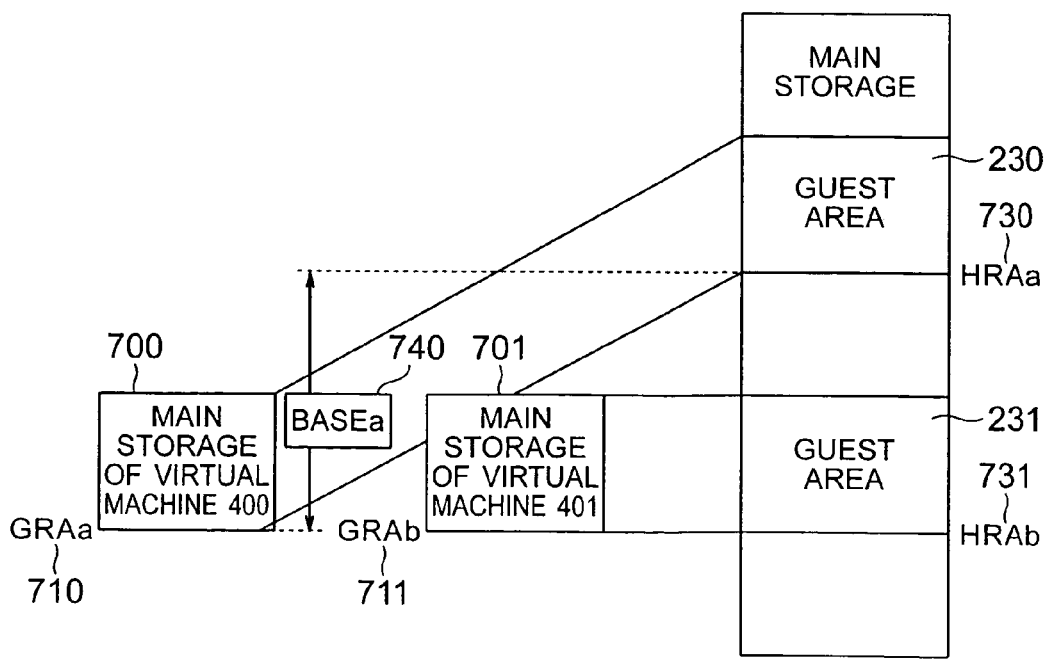
FIG. 6 is a diagram showing the correspondence between the main storage of the virtual machine and the real main storage.

In FIG. 6, reference numerals 230, 231 designate guest areas partitioned from the main storage by the VMM 300 and assigned to the two virtual machines 400, 401 shown in FIG. 1. The host real addresses of the guest areas 230, 231 are HRAa 730 and HRAb 731, respectively. The guest areas 230, 231 correspond to the main storage 700, 701 of the virtual machines 400, 401, respectively, and the guest programs operate in the virtual machines 400, 401 recognizing that the guest real addresses of the main storage 700, 701 are GRAa 710, GRAb 711, respectively.

The guest real address may or may not be equal to the corresponding host real address. The value of the difference between the host real address and the guest real address is called the base value, and this relation is expressed as (host real address =guest real address +base value).

In FIG. 6, BASEa 740 designates the base value indicating the difference between the guest real address GRAa 710 and the corresponding host real address HRAa 730, and the relation HRAa =GRAa +BASEa holds.

In FIG. 6, the description assumes the relation GRAb 711 =HRAb 731. This relation can alternatively be expressed as HRAb =GRAb +BASEb (BASEb =0) as a case in which the base value is 0 constituting the difference between the guest real address and the host real address. Thus, the handling method with the VMM 300 remains the same. The virtual machine 400 assigned the guest area 230 according to an embodiment is explained below.

Assuming that the guest program operating in the virtual machine 400 operates in the real address mode, the VMM 300 registers the translation for setting the correspondence between the guest real address GRAa 710 and the host real address HRAa 730 in one of the plurality of the host page tables, and operates the guest program in the virtual address mode. Specifically, the guest real address is handled as one of the guest virtual addresses. As a result the correspondence between the guest real address GRAa 710 and the host real address HRAa 730 can be executed under the control of the VMM alone, and the program operating in the real computer system can be advantageously used directly as a guest program. Also, the first, second and third embodiments can be used for the guest real address mode and therefore, also in the case where the guest program operates while switching between the real address mode and the virtual address mode.

Fifth Embodiment

Figure 7:
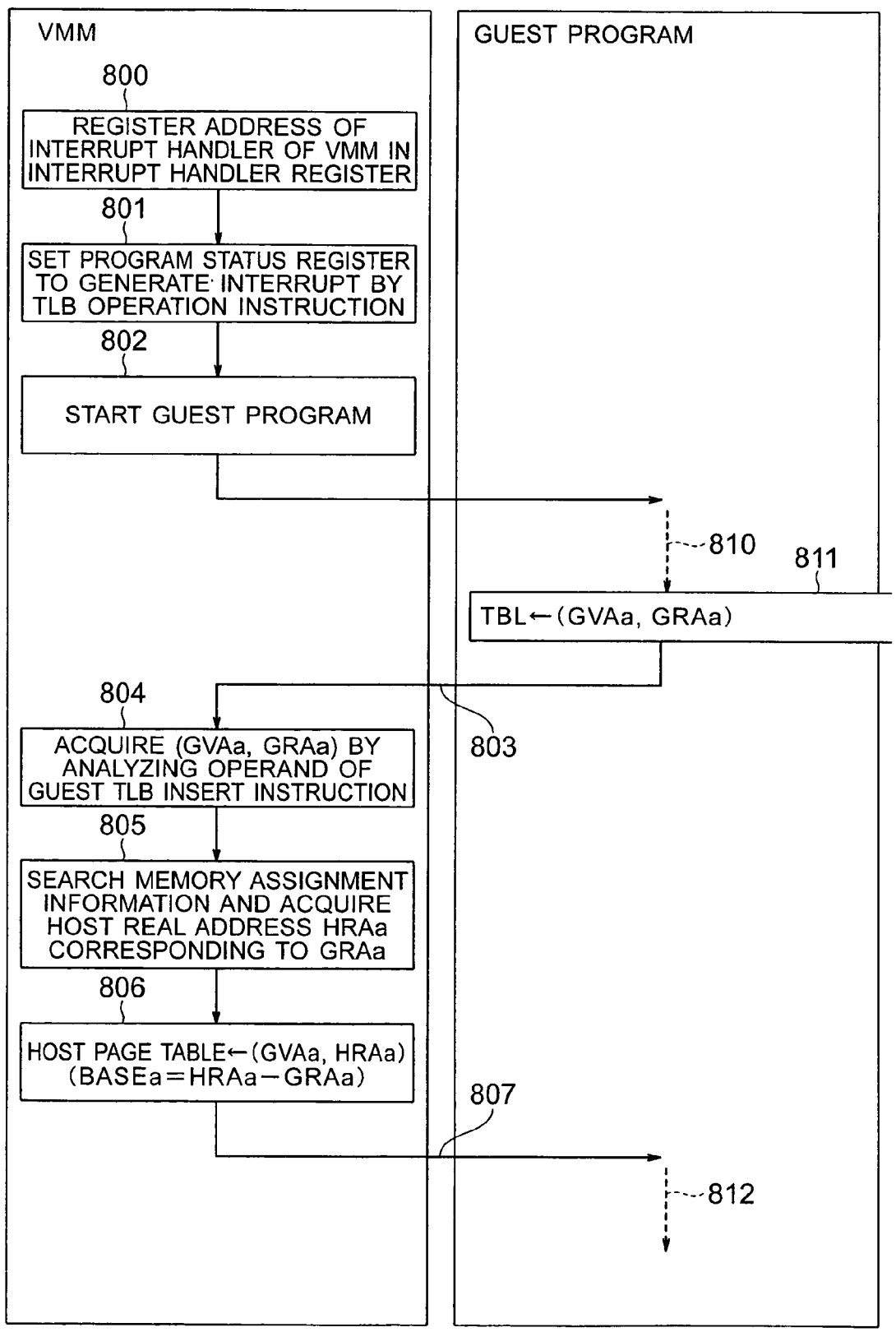
FIG. 7 is a flowchart showing a first method of preparing the host page table.

With reference to FIGS. 7, 8, two methods of preparing a host page table are described. The VMM 300 creates the host page table entry using one or both of the configurations shown in FIGS. 7 and 8.

First, the first method shown in FIG. 7 is explained.

The VMM 300 registers the address of the VMM interrupt handler in the interrupt handler register (step 800), so that the VMM can catch the interrupt during the execution of the guest program. Further, as required, the program status register is set in such a manner that the execution, if any, of the TLB operation instruction by the guest program is suspended and an interrupt is generated (step 801). After that, when the VMM starts the guest program (step 802), the guest instruction is executed on the physical processor (step 810).

Assume that the guest program, in response to a guest TLB insert instruction, attempts to insert the translation information for setting the correspondence between the guest virtual address (GVAa) and the guest real address (GRAa) into the guest page table (step 811). The setting of steps 800, 801 generates an interrupt and the interrupt handler of the VMM 300 operates (step 803). The interrupt handler of the VMM 300 analyzes the operand of the TLB insert instruction and acquires GVAa and GRAa (step 804). Next, the memory assignment information for the virtual machine held by the VMM 300 is accessed, and the host real address HRAa corresponding to the guest real address GRAa is acquired (step 805). The VMM 300 registers the translation information for setting the correspondence between GVAa and HRAa in the host page table (step 806). In the process, the base value BASEa assumes (HRAa-GRAa). After that, the guest program is restarted in response to the instruction following the guest TLB insert instruction (step 807), and the guest program is executed (step 812). Once the guest program accesses the virtual address GVAa, the hardware mechanism for registering the contents of the host page table in the TLB 112 operates, and the translation information for setting the correspondence between GVAa and HRAa is registered in the TLB 112. Thus, in accordance as the GVAa of the guest program is accessed and updated, HRAa is accessed and updated.

Now, the second method shown in FIG. 8 is explained.

The VMM 300 registers the address of the interrupt handler of the VMM in the interrupt handler register (step 800), after which the VMM starts the guest program (step 802) so that the guest instruction is executed on the physical processor (step 810).

In the case where the virtual address GVAa registered in neither the TLB 112 nor the host page table is accessed during the execution of the guest program (step 830), a TLB fault interrupt is generated, and the interrupt handler of the VMM 300 is operated (step 831). The interrupt handler of the VMM 300 searches the guest page table located in the guest area, and acquires the guest real address GRAa corresponding to GVAa (step 820). After that, like in the first method shown in FIG. 7, the host real address HRAa corresponding to the guest real address GRAa is acquired (step 805), and the translation for setting the correspondence between GVAa and the HRAa is registered in the host page table (step 806) and the guest program is restarted (step 807). Then, the guest program is executed again (step 812). When the guest program accesses the virtual address GVAa, the hardware mechanism for registering the contents of the host page table in the TLB 112 is operated, and the translation information for setting the GVAa and the HRAa in correspondence with each other is registered in the TLB 112. Thus, in accordance with the access and updating of the GVAa of the guest program, the HRAa is accessed and updated.

Although the foregoing description concerns the embodiment having two processors, two virtual machines and two or three host page tables, the number of the component elements of the system is not limited.

The invention claimed is:

1. A method of controlling a virtual machine system comprising a host program for operating a guest program on each of a plurality of virtual machines constructed by logically partitioning a main storage and a processor, wherein the processor includes, as an address translation mechanism for translating a guest virtual address into a host real address, a TLB, a page table search mechanism for inserting address translation information into the TLB by searching a host page table on the main storage in the absence of the address translation information in the TLB and an address register for holding the bottom address of the host page tables;

the method comprising the steps of:
generating a plurality of host page tables through the host program;
creating the translation information for setting the guest virtual address and the host real address in correspondence with each other and registering the translation information in the host page tables;
selecting one host page table from the guest program in accordance with the address translation mode for operating the guest program; and
setting the bottom address of the selected host page table in the address register.

2. A method of controlling a virtual machine system according to claim 1,
wherein the address translation mechanism includes a region register for holding a region identifier to support a multiple address space model,
wherein the host program virtualizes the bit width of the region register, and the guest program performs the control operation in such a manner as to use the region identifier adapted to be designated with a bit width smaller than the bit width of the region register,
wherein the remaining bits not used by the guest program are used by the host program to identify the address translation mode of the guest program.

3. A method of controlling a virtual machine system according to claim 1,
wherein as long as the guest program operates in the real address mode, the host program handles the guest real address as a type of guest virtual address, and one of a plurality of the host page tables is used to hold the correspondence between the guest real address and the host real address.

4. A method of controlling a virtual machine system according to claim 1, the system further comprising a means for generating an interrupt with the host program in the case where the guest program attempts to register, in the guest page table in response to a guest TLB insert instruction, the translation information for setting the correspondence between the guest virtual address and the guest real address,
wherein the host program, upon detection of the interrupt, acquires the host real address corresponding to the guest real address of the guest TLB insert instruction, and the translation information for setting the correspondence between the guest virtual address of the guest TLB insert instruction and the host real address is registered in the host page table.

5. A method of controlling a virtual machine system according to claim 1,
wherein a host page table is shared by a plurality of host programs, and another host page table is occupied exclusively by each processor.

6. A virtual machine system for constructing a plurality of virtual machines by logically partitioning a main storage and the processor under a control of a host program and activating a guest program in a predetermined address translation mode on each virtual machine, comprising:
a plurality of host page tables on the main storage for storing the address translation information for setting a correspondence between a guest virtual address and a host real address;
a TLB (translation lookaside buffer) for storing the address translation information of a part of the host page tables;
a page table search mechanism for searching the host page tables and inserting the address translation information in the TLB in the absence of the address translation information in the TLB; and
an address register for holding a bottom address of a host page table corresponding to the address translation mode of the guest program.

7. A virtual machine system according to claim 6, further comprising a region register for holding the region identifier for supporting the multiple address space model,
wherein the host program virtualizes the bit width of the region register, the guest program uses the region identifier that can be designated with a bit width smaller than the bit width of the region register, and the remaining bits not used by the guest program are used by the host program to identify the address translation mode of the guest program.

8. A virtual machine system according to claim 6, further comprising a host page table shared by a plurality of processors and another host page table exclusively occupied by each processor.

* * * * *